United States Patent
Odaka et al.

(10) Patent No.: US 9,894,911 B2
(45) Date of Patent: Feb. 20, 2018

(54) METHOD FOR MANUFACTURING MODIFIED WHEY COMPOSITION

(71) Applicant: Morinaga Milk Industry Co., Ltd., Tokyo (JP)

(72) Inventors: Mirei Odaka, Zama (JP); Tomoya Murakami, Zama (JP); Yohei Sakai, Zama (JP); Kiyotaka Miyauchi, Tokyo (JP); Hiroshi Koishihara, Zama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 407 days.

(21) Appl. No.: 14/406,871

(22) PCT Filed: Jun. 14, 2013

(86) PCT No.: PCT/JP2013/066523
§ 371 (c)(1),
(2) Date: Dec. 10, 2014

(87) PCT Pub. No.: WO2013/187519
PCT Pub. Date: Dec. 19, 2013

(65) Prior Publication Data
US 2015/0140194 A1 May 21, 2015

(30) Foreign Application Priority Data
Jun. 15, 2012 (JP) ................. 2012-136106

(51) Int. Cl.
*A23C 21/00* (2006.01)
*A23C 21/10* (2006.01)
*A23J 1/20* (2006.01)
*A23J 3/08* (2006.01)

(52) U.S. Cl.
CPC ............. *A23C 21/10* (2013.01); *A23C 21/00* (2013.01); *A23J 1/20* (2013.01); *A23J 1/205* (2013.01); *A23J 3/08* (2013.01)

(58) Field of Classification Search
CPC ..... A23C 21/00; A23J 3/08; A23J 1/20; A23J 1/205
USPC ......... 426/74, 520, 521, 522, 580, 583, 656, 426/657
See application file for complete search history.

(56) References Cited

U.S. PATENT DOCUMENTS

| | | | |
|---|---|---|---|
| 3,791,283 A | 2/1974 | Moreno et al. | |
| 4,748,034 A | 5/1988 | de Rham | |
| 4,879,131 A | 11/1989 | de Rahm | |
| 4,897,279 A | 1/1990 | Lehmann et al. | |

FOREIGN PATENT DOCUMENTS

| | | |
|---|---|---|
| CN | 101123884 A | 2/2008 |
| JP | 01132335 A | 5/1989 |
| JP | 2000217511 A | 8/2000 |
| JP | 2010166843 A | 8/2010 |
| JP | 2010187595 A | 9/2010 |
| NZ | 546105 A | 4/2009 |
| WO | 2010047230 A1 | 4/2010 |

OTHER PUBLICATIONS

European Patent Office, Extended European Search Report issued in corresponding European Patent Application No. 13803647.0 dated Jan. 22, 2016.
The State Intellectual Property Office of the People's Republic of China, Notification of First Office Action issued in corresponding Chinese Patent Application No. 201380030954.0 and English-language translation dated Nov. 12, 2015.
Australian Patent Office; Office Action in Australian Patent Application No. 2013275183 dated Apr. 20, 2015; 5 pages.
Office Action issued in New Zealand Patent Application No. 702837, dated Jun. 4, 2015, 3 pages.
Anonymous: "Whey Protein Supplement Product Description," MINTEL, Dec. 1, 2003 (Dec. 1, 2003), pp. 1-2.
European Patent Office, Office Action issued in corresponding European Patent Application No. 13803647.0 dated May 10, 2017, 4 pages.
Hidalgo, J., et al., "Solubility and Heat Stability of Whey Protein Concentrates," J. Dairy Sci, vol. 60, No. 10, pp. 1515-1518 (1977) (4 pages).
Japanese Patent Office, International Search Report issued in corresponding International Patent Application No. PCT/JP2013/066523 and English-language translation dated Sep. 10, 2013 (4 pages).

*Primary Examiner* — Leslie Wong
(74) *Attorney, Agent, or Firm* — Wood Herron & Evans LLP

(57) ABSTRACT

The present invention relates to a method for manufacturing a modified whey composition, the method having a liquid preparation step of preparing a raw material whey liquid using a whey composition containing whey protein, and a heating step of subjecting the raw material whey liquid to a heat treatment, wherein the liquid preparation step includes a treatment of adding an alkali to the whey composition, the pH of the raw material whey liquid is from 6.8 to 8.0 and the protein concentration in the liquid is not more than 1.3% by mass, the calcium content of the raw material whey liquid that is subjected to the heat treatment is from 400 to 700 mg/100 g of solids, and the heat treatment is performed under conditions of 80 to 150° C. for a period of 30 minutes to 1 second.

10 Claims, No Drawings

METHOD FOR MANUFACTURING MODIFIED WHEY COMPOSITION

TECHNICAL FIELD

The present invention relates to a method for manufacturing a modified whey composition containing whey protein, a modified whey composition obtained using the manufacturing method, and a method for manufacturing a calcium-enriched modified whey composition using the manufacturing method.

Priority is claimed on Japanese Patent Application No. 2012-136106, filed Jun. 15, 2012, the content of which is incorporated herein by reference.

BACKGROUND ART

Whey (milk serum) is a by-product of manufacturing cheese or the like, and has conventionally been discarded as waste.

In recent years, effective ways of using this by-product have been investigated, and as well as being used as a raw material for whey protein or lactose, whey is also being used as a flavor improver in bread and cakes, a raw material for beverages, and a raw material for milk formula for infants.

However, whey has poor thermal stability, and when heating is performed for pasteurization purposes or the like, precipitation or gelling tends to occur due to aggregation and the like of the whey protein contained within the whey. Accordingly, in order to ensure no denaturation of the whey protein, pasteurization treatments for whey or products containing whey as a raw material must be conducted using a low temperature long time pasteurization method (LTLT) or a high temperature short time pasteurization method (HTST), for example by heating within a range from approximately 63° C. for 30 minutes through to 72° C. for 15 seconds, and therefore applications for whey have been limited.

Dairy products hold great promise as a good source of calcium, and whey is no exception. However, as described above, whey suffers from the problem of having low thermal stability. In particular, if a calcium-containing compound is added to whey to increase the calcium content, with the aim of enhancing the usability of the product as a calcium source, then the thermal stability deteriorates even further.

If the calcium is removed from whey, then although the thermal stability improves, the calcium content falls below that of the raw material whey, and therefore its usability as a calcium source is lost.

In response to these types of problems, a variety of investigations have been conducted with the aim of improving the thermal stability of whey.

For example, Patent Document 1 discloses a method for manufacturing a modified whey product which has excellent thermal stability, and retains good thermal stability even when the calcium content is increased, the method including a calcium reduction step of reducing the calcium content of a raw material whey liquid to obtain a calcium-reduced whey liquid having a calcium content of not more than 313 mg/100 g of solids and a protein content of not more than 21 g/100 g of solids, and a heat treatment step of heat treating the calcium-reduced whey liquid under conditions of 80 to 150° C. for a period of 30 minutes to 1 second. The reduction of the calcium content in the raw material whey liquid is performed by a cation exchange treatment.

Patent Document 2 discloses a method of obtaining a fermented whey preparation by subjecting an aqueous solution of whey protein prepared with a solid content concentration of 11 to 35% by weight and a pH of 6.5 to 8.0 to high-temperature pasteurization, followed by lactic acid fermentation and then homogenization of the obtained fermented liquid, wherein the lactose contained in the aqueous solution of whey protein after the high-temperature pasteurization is enzymatically degraded by lactase before the lactic acid fermentation, during the lactic acid fermentation and/or after the lactic acid fermentation, thereby enhancing the sweet taste.

CITATION LIST

Patent Documents

Patent Document 1: JP2010-166843-A
Patent Document 2: WO2010/047230

SUMMARY OF THE INVENTION

Problems to be Solved by the Invention

In the method disclosed in Patent Document 1, the calcium in the raw material whey liquid is reduced, and the resulting liquid is subjected to a high-temperature heating treatment in this state to improve the thermal stability, and even if the calcium content of the obtained modified whey product is subsequently increased, excellent thermal stability is maintained. However, there is still room for improvement in the thermal stability, and for example if the calcium content exceeds 650 mg/100 g of solids, then the thermal stability tends to be inadequate.

Moreover, conventional whey, and particularly whey powder, has a characteristic odor (whey odor), and when added to other products, the whey can impair the flavor of the product. The same problem exists for modified whey products obtained using the method disclosed in Patent Document 1.

In the method disclosed in Patent Document 2, by subjecting the aqueous solution of whey protein that has been prepared with a solid content concentration of 11 to 35% by weight and a pH of 6.5 to 8.0 to high-temperature pasteurization, aggregates of appropriate dimensions which do not precipitate immediately are produced in the aqueous solution. By subjecting this aqueous solution, as is, to lactic acid fermentation, and then homogenizing the obtained fermented liquid, a fermented whey preparation which combines excellent flavor and texture can be obtained. However, in this method, because aggregates are produced, products containing this preparation will also contain the aggregates. As a result, the preparation is unsuitable for addition to transparent liquid products (such as beverages).

Accordingly, a technique is required which can achieve sufficient thermal stability to enable high-temperature heat pasteurization to be performed without producing aggregates even when the calcium content is high, as well as yielding excellent flavor.

The present invention has been developed to address the problems mentioned above, and has an object of providing a method for manufacturing a modified whey composition which yields excellent thermal stability and an excellent flavor improvement effect for a whey composition containing whey protein, a modified whey composition obtained using the manufacturing method, and a method for manufacturing a calcium-enriched modified whey composition using the manufacturing method.

Means to Solve the Problems

As a result of intensive investigations, the inventors of the present invention discovered that, prior to conducting a heat treatment of a whey composition containing whey protein, by performing a preliminary pH adjustment, and where necessary a protein concentration adjustment or the like, to obtain a raw material whey liquid having a pH of 6.8 to 8.0 and a protein concentration of not more than 1.3% by mass, and in this state, subsequently performing a heat treatment under heating conditions which cause complete denaturation of the whey protein of a raw material whey liquid having a calcium content of 400 to 700 mg/100 g of solids, the above object could be achieved.

A first aspect of the present invention is a method for manufacturing a modified whey composition, the method having a liquid preparation step of preparing a raw material whey liquid using a whey composition containing whey protein, and a heating step of subjecting the raw material whey liquid to a heat treatment, wherein the liquid preparation step includes a treatment of adding an alkali to the whey composition, the pH of the raw material whey liquid is from 6.8 to 8.0, and the protein concentration in the liquid is not more than 1.3% by mass, the calcium content of the raw material whey liquid that is subjected to the heat treatment is from 400 to 700 mg/100 g of solids, and the heat treatment is performed under conditions of 80 to 150° C. for a period of 30 minutes to 1 second.

For the first aspect described above, the following aspects are preferred.

(1) The method for manufacturing a modified whey composition, wherein the alkali is one or both of sodium hydroxide and potassium hydroxide.

(2) The method for manufacturing a modified whey composition or the method for manufacturing a modified whey composition according to (1) above, wherein when the modified whey composition is evaluated by a calcium-enriched thermal stability test, the volume of precipitate following a centrifugal separation treatment of the evaluation sample is not more than 1 mL/100 mL.

(3) The method for manufacturing a modified whey composition according to (2) above, wherein the volume of precipitate following the centrifugal separation treatment of the evaluation sample is not more than 0.5 mL/100 mL.

(4) The method for manufacturing a modified whey composition according to (3) above, wherein when the modified whey composition is evaluated by the calcium-enriched thermal stability test, particles in the liquid of the evaluation sample following a retort heat treatment but prior to the centrifugal separation treatment have a particle size distribution in which the amount of particles having a particle size exceeding 1 μm is not more than 10% of all the particles in the liquid.

In the method for manufacturing a modified whey composition according to the first aspect described above, it is preferable that compared with the masses of hexanal, heptanal and 1-octen-3-ol in the odor of the whey composition, the masses of hexanal, heptanal and 1-octen-3-ol in the odor of the modified whey composition are reduced by at least 85%, at least 75% and at least 60% respectively.

A second aspect of the present invention is a modified whey composition obtained using the manufacturing method of the first aspect described above.

For the second aspect described above, the following aspects are preferred.

(1) The modified whey composition described above, wherein when the modified whey composition is evaluated by a calcium-enriched thermal stability test, the volume of precipitate following a centrifugal separation treatment of the evaluation sample is not more than 1 mL/100 mL.

(2) The modified whey composition according to (1) above, wherein the volume of precipitate following the centrifugal separation treatment of the evaluation sample is not more than 0.5 mL/100 mL.

(3) The modified whey composition according to (2) above, wherein when the modified whey composition is evaluated by the calcium-enriched thermal stability test, particles in the liquid of the evaluation sample following a retort heat treatment but prior to the centrifugal separation treatment have a particle size distribution in which the amount of particles having a particle size exceeding 1 μm is not more than 10% of all the particles in the liquid.

In the present description, in the aforementioned calcium-enriched thermal stability test, a modified whey composition targeted by the evaluation which is liquid is used, as is, as the evaluation sample, whereas a powder composition is dissolved in water at 50° C. to form an aqueous solution having a solid content of 10%, and this solution is used as the evaluation sample. A 5% aqueous solution of calcium chloride is added to the evaluation sample, as necessary, to adjust the total calcium content to 700 mg/100 g of solids, thus forming an evaluation sample composed of a calcium-enriched whey liquid, and this calcium-enriched whey liquid evaluation sample is then subjected to a retort heat treatment at 120° C. for 10 minutes. Following the retort heat treatment, the evaluation sample is subjected to a centrifugal separation treatment at 3,000 rpm (centrifugal force: 1,500 g) for 5 minutes, and the volume of precipitate produced (mL/100 mL) is measured.

A third aspect of the present invention is a method for manufacturing a calcium-enriched modified whey composition, the method having a step of obtaining a modified whey composition by performing a liquid preparation step of preparing a raw material whey liquid using a whey composition containing whey protein, and a heating step of subjecting the raw material whey liquid to a heat treatment, and a step of obtaining a calcium-enriched modified whey composition by adding a calcium-containing compound to the modified whey composition, wherein the liquid preparation step includes a treatment of adding an alkali to the whey composition, the pH of the raw material whey liquid is from 6.8 to 8.0, and the protein concentration in the liquid is not more than 1.3% by mass, the calcium content of the raw material whey liquid that is subjected to the heat treatment is at least 400 mg/100 g of solids but less than 700 mg/100 g of solids, the heat treatment is performed under conditions of 80 to 150° C. for a period of 30 minutes to 1 second, and following addition of the calcium-containing compound, the calcium content exceeds 400 mg/100 g of solids but is not more than 700 mg/100 g of solids.

Effects of the Invention

The present invention is able to provide a method for manufacturing a modified whey composition which exhibits excellent thermal stability and an excellent flavor improvement effect for a whey composition containing whey protein, a modified whey composition obtained using the manufacturing method, and a method for manufacturing a calcium-enriched modified whey composition using the manufacturing method.

EMBODIMENTS FOR CARRYING OUT THE INVENTION

<<Method for Manufacturing Modified Whey Composition>>

The method for manufacturing a modified whey composition according to the first aspect of the present invention has a liquid preparation step of preparing a raw material whey liquid using a whey composition containing whey protein, and a heating step of subjecting the raw material whey liquid to a heat treatment, wherein the liquid preparation step includes a treatment of adding an alkali to the whey composition, the pH of the raw material whey liquid is from 6.8 to 8.0, and the protein concentration in the raw material whey liquid is not more than 1.3% by mass, the calcium content of the raw material whey liquid that is subjected to the heat treatment is from 400 to 700 mg/100 g of solids, and the heat treatment is performed under conditions of 80 to 150° C. for a period of 30 minutes to 1 second.

Another aspect of the present invention is a method for modifying a whey composition, the method having a liquid preparation step of preparing a raw material whey liquid using a whey composition containing whey protein, and a heating step of subjecting the raw material whey liquid to a heat treatment, wherein the liquid preparation step includes a treatment of adding an alkali to the whey composition, the pH of the raw material whey liquid is from 6.8 to 8.0, and the protein concentration in the raw material whey liquid is not more than 1.3% by mass, the calcium content of the raw material whey liquid that is subjected to the heat treatment is from 400 to 700 mg/100 g of solids, and the heat treatment is performed under conditions of 80 to 150° C. for a period of 30 minutes to 1 second.

In the present description, unless specified otherwise, pH is defined as the value at 25° C. In other words, even if a pH value falls outside the range specified in the present description, if the pH value satisfies the range specified in the present invention upon correction to an equivalent pH value at 25° C., then that pH is also included within the scope of the present invention.

By subjecting the raw material whey liquid having a calcium content of 400 to 700 mg/100 g of solids, in a state in which the pH is at least 6.8 but not more than 8.0, and the protein concentration in the liquid is not more than 1.3% by mass, to a heat treatment at 80 to 150° C. for a period of 30 minutes to 1 second, an excellent thermal stability improvement effect can be obtained. Further, the odor of the whey composition prior to modification (such as the whey odor) is removed, thus improving the flavor.

On the other hand, if the pH of the raw material whey liquid subjected to the heat treatment, the protein concentration in the liquid, or the heat treatment conditions does not satisfy the respective range described above, then there is a possibility that the whey protein contained in the raw material whey liquid may aggregate during the heat treatment, producing a precipitate in the raw material whey liquid. Other whey compositions (modified whey compositions) manufactured by manufacturing methods other than the aspect described above, and modified whey compositions in which the calcium content has been increased by adding a calcium-containing compound to one of these other whey compositions (calcium-enriched modified whey compositions) tend to have inadequate thermal stability, and when these modified whey compositions are reheated in the liquid state, there is a possibility that precipitation or gelling may occur. Further, there is a possibility that an improvement in flavor may be unattainable.

In the liquid preparation step, the treatment that is performed to obtain the raw material whey liquid having a pH and a protein concentration in the liquid that satisfy the above ranges is preferably conducted under temperature conditions that do not cause denaturation of the whey protein. These temperature conditions typically require a temperature of not more than 74° C., and preferably a temperature within a range from 1 to 74° C.

A more detailed description of each of the steps is provided below.

<Liquid Preparation Step>

In the liquid preparation step, the raw material whey liquid is prepared using a whey composition containing whey protein. When the whey composition is provided in the form of a powder or the like, the composition may first be dissolved in order to prepare the raw material whey liquid. When the whey composition is a liquid, the liquid can be used directly to prepare the raw material whey liquid. The raw material whey liquid is prepared with a pH of at least 6.8 but not more than 8.0, and a protein concentration in the liquid of not more than 1.3% by mass.

The whey composition which has yet to be modified by the method for manufacturing a modified whey composition or the method for modifying a whey composition according to the present aspect, and which is supplied to the method for manufacturing a modified whey composition or the method for modifying a whey composition according to the present aspect (hereafter this whey composition is also referred to as the "unmodified whey composition", and the simplified expression "whey composition" is also used to indicate the "unmodified whey composition" in the present description) contains only components derived from whey in the solid content.

"Whey" is obtained using milk from cows, sheep or goats or the like as a raw material, and refers to the transparent liquid which is obtained when the coagulated milk fraction is removed during the manufacture of cheese, casein, sodium caseinate or yoghurt or the like. The majority of whey is composed of water. The whey separated during the manufacture of cheese or the like usually has a solid content containing protein (whey protein), lactose, ash and fat, but when converted to a whey composition product such as a whey powder, the majority of the fat is removed. The protein is composed solely of whey protein, and does not contain other milk proteins such as casein.

Whey is usually obtained by separating the solid content (coagulated milk fraction) from a milk fermentation product obtained by subjecting milk to lactic acid fermentation and where necessary performing a reaction with a milk-coagulating enzyme (rennet), and therefore the whey is more acidic than the raw material milk. The pH of milk is approximately 6.8, and therefore the pH of whey is less than 6.8. For example, the pH of the whey produced as a by-product in a cheese manufacturing process varies depending on the fermentation conditions such as the type of lactic acid bacteria used, but is typically from approximately 4.6 to 6.3.

As a result, the pH obtained when the unmodified whey composition is simply dissolved (diluted) in water to obtain a liquid having a protein concentration in the liquid of not more than 1.3% by mass is typically less than 6.8, and therefore in order to obtain a raw material whey liquid having a pH of at least 6.8 but not more than 8.0, a treatment in which at least an alkali is added to the unmodified whey composition is required.

The unmodified whey composition may be any composition containing whey protein. For example, a whey in which the coagulated milk fraction is simply separated (also referred to as "raw whey"), a whey obtained by subjecting this raw whey to a component separation treatment such as defatting, demineralization or lactose removal using a separator, a separation membrane or an ion exchange resin or the like (namely, a whey isolate), or a whey obtained by concentrating a raw whey or whey isolate (a whey concentrate) may be used, and a whey powder obtained by powdering a raw whey, a whey isolate or a whey concentrate using a conventional method such as spray drying or freeze drying (namely, a whey powder, a whey protein concentrate (WPC) or a whey protein isolate (WPI)) may also be used. A single type of unmodified whey composition may be used alone, or a combination of two or more types may be used.

The unmodified whey composition may use a composition manufactured by conventional methods, or may use a commercially available product. For example, commercially available WPC, WPI or whey powders (such as sweet whey powder, demineralized whey powder or defatted whey powder) can be used.

The higher the acidity (the lower the pH) of the unmodified whey composition, the worse the thermal stability is when used without any modification, and the more limited the potential applications, and therefore the method for manufacturing a modified whey composition or the method for modifying a whey composition according to the present aspect are extremely useful.

The pH of the unmodified whey composition used as the raw material in the present invention is typically from 4.6 to 6.4.

The liquid preparation step includes at least a treatment of adding an alkali to the unmodified whey composition (hereafter referred to as the pH adjustment treatment).

There are no particular limitations on the alkali used in the pH adjustment treatment, and any alkali that may be used for the pH adjustment of foodstuffs is suitable, including sodium hydroxide, potassium hydroxide, sodium carbonate, potassium carbonate, sodium bicarbonate, and tripotassium phosphate. These compounds may be used individually, or a combination of two or more compounds may be used. In terms of the thermal stability and the flavor and the like of the obtained modified whey composition, all alkalis yield similar results, but in terms of neutralization capability, sodium hydroxide or potassium hydroxide is particularly preferable.

The alkali is preferably used in the form of an aqueous solution. From the viewpoint of facilitating fine adjustment of the pH, the concentration of the alkali aqueous solution is preferably from 0.5 to 10% by mass, and more preferably from 0.5 to 5% by mass.

The liquid preparation step may include a dilution treatment of adding water to the unmodified whey composition. The dilution treatment may be performed before, after, or both before and after the aforementioned pH adjustment treatment.

When the unmodified whey composition is in powder form, a dissolution treatment to alter the composition to liquid form is preferably performed before the pH adjustment treatment.

The amount of water added in the dilution treatment is set with due consideration of factors such as the amount of the alkali aqueous solution added in the pH adjustment treatment, so that the protein concentration in the liquid of the finally obtained raw material whey liquid is not more than 1.3% by mass.

The liquid preparation step may also include a demineralization treatment (such as a demineralization treatment using a cation exchange treatment, an electrodialysis treatment or a membrane separation treatment) for removing at least a portion of the salt fraction contained within the unmodified whey composition.

Examples of the salt fraction include salts of alkali metals such as sodium and potassium, and salts of alkaline earth metal salts such as calcium.

The demineralization treatment may be performed before, after, or both before and after the aforementioned pH adjustment treatment.

The demineralization treatment is typically performed with the unmodified whey composition in a liquid state.

When the demineralization treatment is performed before the pH adjustment treatment, if the unmodified whey composition is in liquid form, then the unmodified whey composition may be supplied without further modification to the demineralization treatment, or may first be subjected to a dilution treatment before being supplied to the demineralization treatment. If the unmodified whey composition is in powder form, then the whey composition is first subjected to the dilution treatment before being supplied to the demineralization treatment.

When the demineralization treatment is performed after the pH adjustment treatment, the pH-adjusted unmodified whey composition is usually in liquid form. This unmodified whey composition may be supplied without further modification to the demineralization treatment, or may first be subjected to a dilution treatment before being supplied to the demineralization treatment.

A conventional demineralization treatment method can be used as appropriate for the demineralization treatment. For example, by subjecting the aforementioned unmodified whey composition, or an unmodified whey composition that has undergone the aforementioned dilution treatment, or an unmodified whey composition that has undergone the aforementioned pH adjustment treatment, to a cation exchange treatment, an electrodialysis treatment or a membrane separation treatment or the like, monovalent or divalent cations in the solution can be selectively removed. One of these treatments may be used alone, or two or more treatments may be performed sequentially.

The demineralization treatment may include a calcium reduction treatment.

The calcium reduction treatment can be performed using a cation exchange treatment or a membrane separation treatment. One of these treatments may be performed alone, or both treatments may be performed in a sequential manner.

The cation exchange treatment can be performed using a cation exchange resin that can remove calcium ions by exchanging them with other ions, and is performed by bringing the unmodified whey composition into contact with the cation exchange resin, or more specifically, by passing the liquid of the unmodified whey composition across the cation exchange resin. There are no particular limitations on the salt (displacing salt) of the other ion that is exchanged with the calcium ions, and any displacing salt that can remove the calcium ions may be used.

Other cations besides the calcium ions in the raw material whey liquid may also be removed at the same time by the cation exchange treatment.

The type of cation exchange resin used may be either a strongly acidic resin or a weakly acidic resin. The displacing salt can use, for example, a sodium salt, a potassium salt, or a sodium-potassium mixed salt. Alternatively, a cation exchange resin in which a portion of the displacing salt contains hydrogen or magnesium or the like can also be used. Of these options, from the perspective of achieving a good balance in the flavor of the obtained modified whey composition, a sodium salt or a sodium-potassium mixed salt is preferable, and a sodium-potassium mixed salt is the most desirable.

There are no particular limitations on the conditions employed for passing the unmodified whey composition across the cation exchange resin, provided the calcium ions can be removed in a satisfactory amount. Examples include a batch method in which the resin and the liquid to be treated are brought into contact and stirred while the reaction progresses, and a method in which treatment is performed continuously using a column. In the case of the column method, the SV (space velocity) is preferably within a range from 0.5 to 10, more preferably from 1 to 7, and particularly preferably from 1 to 5.

The temperature for the passing of the unmodified whey composition can be set appropriately within a temperature range that does not cause precipitation of the lactose or denaturation of the whey protein, provided the calcium ions are able to be removed satisfactorily. For example, a temperature within a range from 1 to 70° C. is preferable.

The membrane separation treatment is preferably a method that uses a nanofiltration membrane module or a diafiltration method (a dialysis filtration method), and using both methods in sequence is particularly preferable. Further, an ultrafiltration module may be used to simultaneously remove lactose and calcium ions.

Usually, the calcium content of the unmodified whey composition that has not undergone a calcium reduction treatment is preferably within a range from 400 to 700 mg/100 g of solids, more preferably from 500 to 600 mg/100 g of solids, and particularly preferably from 509 to 577 mg/100 g of solids.

However, in the method for manufacturing a modified whey composition or the method for modifying a whey composition according to the present aspect, the aforementioned calcium reduction treatment is not essential, and may be excluded.

Not including the calcium reduction treatment in the liquid preparation step offers the advantage that the whey composition can be modified more easily.

Further, by performing the calcium reduction treatment with a cation exchange resin, the concentration of alkali metal salts such as sodium salts increases, making the flavor more salty. Not including this treatment in the liquid preparation step also offers the advantage that a modified whey composition having a smaller alkali metal salt content can be obtained more readily.

The pH of the raw material whey liquid prepared in the liquid preparation step, namely the pH at the start of the heat treatment in the heating step, is typically at least 6.8 but not more than 8.0, preferably at least 6.9 but not more than 7.5, and more preferably at least 7.0 but not more than 7.3.

Provided the pH is at least 6.8, the thermal stability improvement effect achieved as a result of the subsequent heat treatment is excellent. Provided the pH is not more than 8.0, the liquid color and the flavor following the heat treatment are favorable.

When a demineralization treatment is performed after the pH adjustment treatment, the pH may change depending on the demineralization treatment method used. If a demineralization treatment is performed, and the demineralization treatment causes a change in the pH to a value of less than 6.8 or more than 8.0, then a treatment may be performed after the demineralization treatment in which a pH modifier (an alkali or acid) is added to the raw material whey liquid to adjust the pH to a value of at least 6.8 but not more than 8.0.

The raw material whey liquid contains at least whey protein.

The "raw material whey liquid" means a liquid composition containing the aforementioned unmodified whey composition prepared in the liquid preparation step of the present aspect using the unmodified whey composition, and means the liquid composition which has not yet been subjected to the heating step of the method for manufacturing a modified whey composition or the method for modifying a whey composition according to the present aspect, and which is to be supplied to the heating step of the method for manufacturing a modified whey composition or the method for modifying a whey composition according to the present aspect.

From the viewpoint of thermal stability, the protein concentration in the raw material whey liquid prepared in the liquid preparation step, namely the protein concentration in the liquid at the start of the heat treatment in the heating step, is not more than 1.3% by mass.

In the present description, the "protein concentration in the liquid" means the concentration represented by the mass of protein contained within the raw material whey liquid relative to the total mass of the entire raw material whey liquid.

There are no particular limitations on the lower limit for the protein concentration in the raw material whey liquid from the viewpoint of the thermal stability, and any concentration exceeding 0% by mass is appropriate. If consideration is given to productivity and manufacturing suitability, then a concentration of at least 0.2% by mass is preferable.

In other words, the protein concentration in the raw material whey liquid is preferably more than 0% by mass but not more than 1.3% by mass, more preferably at least 0.2% by mass but not more than 1.3% by mass, and particularly preferably at least 0.5% by mass but not more than 1.3% by mass.

The protein concentration in the raw material whey liquid can be determined using a conventional protein measurement method such as the Kjeldahl method, or can be calculated from the protein content of the raw material whey.

From the viewpoint of thermal stability, the protein contained in the raw material whey liquid is preferably only whey protein.

The raw material whey liquid may include components besides the protein. Examples of these components besides the protein include the components other than protein contained within the unmodified whey composition, including sugars such as lactose, ash, and fat.

There are no particular limitations on the solid content concentration of the raw material whey liquid, provided the protein concentration in the liquid satisfies the aforementioned range, but the solid content concentration is preferably from 1 to 40% by mass, and more preferably from 1 to 20% by mass, relative to the total mass of the entire raw material whey liquid. Provided the solid content concentration satisfies this range, problems such as crystallization and precipitation of lactose can be avoided.

The solid content concentration of the raw material whey liquid can be determined by a conventional sand mixing method, or a method which uses a simple water content measuring device.

<Heating Step>

In the heating step, the raw material whey liquid obtained in the liquid preparation step is heat treated under conditions of 80 to 150° C. for a period of 30 minutes to 1 second. As a result of this heat treatment, the unmodified whey composition contained in the raw material whey liquid is modified, and a modified whey composition is obtained.

Usually, the calcium content of the raw material whey liquid subjected to the heat treatment is preferably within a range from 400 to 700 mg/100 g of solids, more preferably from 500 to 600 mg/100 g of solids, and particularly preferably from 509 to 577 mg/100 g of solids.

The heat treatment can be performed, for example, by raising the temperature to a treatment temperature of at least 80° C. but not more than 95° C., and preferably at least 85° C. but not more than 95° C., and then holding the treatment temperature for a period of at least 5 minutes but not more than 30 minutes.

In order to achieve better thermal stability, the heat treatment preferably includes at least treatment under conditions of 120 to 150° C. for a period of 5 minutes to 1 second. For example, in a preferred treatment, the treatment temperature is increased to at least 80° C. but not more than 95° C., a primary heat treatment is performed by holding this treatment temperature for at least 5 minutes but less than 30 minutes, and a secondary heat treatment is then performed by holding the temperature at 120 to 150° C. for a period of 5 minutes to 1 second.

The heat treatment can be performed by an indirect heating method using a batch type, plate type or tubular type pasteurizer or the like, or by a direct heating method using an infusion type or injection type pasteurizer.

Following the heat treatment, the raw material whey liquid may be used directly as a liquid modified whey composition, may be subjected to a concentration step to obtain a concentrated liquid type modified whey composition, or may be subjected to a concentration step and a drying step to obtain a powdered modified whey composition. The concentration step can be performed using conventional methods.

The drying step can be performed using a conventional drying method such as freeze drying or spray drying.

The modified whey composition obtained by modifying the unmodified whey composition using the method for manufacturing a modified whey composition or the method for modifying a whey composition according to the first aspect (namely, the modified whey composition of the second aspect of the present invention) has at least superior thermal stability when compared with the unmodified whey composition.

The modified whey composition is resistant to precipitation or gelling, for example when the composition in liquid form is heated as is, when the composition in powder form is returned to a liquid form and then heated, or when a calcium-enriched composition obtained by adding a calcium-containing compound to the modified whey composition is heated. The thermal stability is higher than that of the unmodified whey composition, and also higher than the modified whey composition obtained using the method disclosed in Patent Document 1, and for example, excellent thermal stability can be maintained even when a calcium-containing compound is added in such an amount that the calcium content exceeds 650 mg/100 g of solids.

Further, in the modified whey composition, the whey odor and the like associated with the unmodified whey composition has been removed, with the modified whey composition having minimal whey odor compared with the unmodified whey composition, and having a favorable flavor with a natural milk sensation.

One aspect of the present invention is a method for reducing the odor of whey.

In other words, one aspect of the present invention is a method for reducing the odor of whey, the method having a liquid preparation step of preparing a raw material whey liquid using a whey composition containing whey protein, and a heating step of subjecting the raw material whey liquid to a heat treatment, wherein the liquid preparation step includes a treatment of adding an alkali to the whey composition, the pH of the raw material whey liquid is from 6.8 to 8.0, and the protein concentration in the liquid is not more than 1.3% by mass, the calcium content of the raw material whey liquid that is subjected to the heat treatment is from 400 to 700 mg/100 g of solids, and the heat treatment is performed under conditions of 80 to 150° C. for a period of 30 minutes to 1 second.

Definitions of terms and preferred embodiments for the above method for reducing the odor of whey are the same as the definitions of terms and preferred embodiments described above for the method for manufacturing a modified whey composition and the method for modifying a whey composition.

In the present description, the term "modified" means imparting the unmodified whey composition with at least superior thermal stability, and preferably means not only imparting superior thermal stability, but also reducing the odor of whey associated with the unmodified whey composition. A "modified whey composition" means a whey composition that is imparted with at least superior thermal stability compared with the unmodified whey composition.

More specifically, a "modified whey composition" means a whey composition which, when evaluated by the aforementioned calcium-enriched thermal stability test, exhibits a volume of precipitate following the centrifugal separation treatment of the evaluation sample that is not more than 1 mL/100 mL, and preferably not more than 0.5 mL/100 mL. Further, when evaluated by the aforementioned calcium-enriched thermal stability test, it is preferable that no precipitation or gelling can be visually detected in the evaluation target following the retort heat treatment but prior to the centrifugal separation treatment, wherein the state in which "no precipitation or gelling can be visually detected" typically describes a state in which measurement of the particle size distribution reveals that the amount of particles having a particle size exceeding 1 μm in the liquid of the evaluation target is not more than 10% of all the particles in the liquid.

Further, in the "modified whey composition" according to the present invention, it is preferable that the whey odor and the like involved with the unmodified whey composition has been removed, with the modified whey composition having minimal whey odor compared with the unmodified whey composition.

"Removal of the whey odor and the like" includes both removal to the extent that the whey odor and the like is undetectable by the human sense of smell, and reduction in the whey odor and the like involved with the unmodified whey composition.

Moreover specifically, removal of the whey odor means reducing the masses of hexanal, heptanal and 1-octen-3-ol within the whey odor.

The reason for using hexanal, heptanal and 1-octen-3-ol as indicators of the whey odor is that it is widely recognized that hexanal, heptanal and 1-octen-3-ol, which have high VIP (variance importance in projection) values in a whey odor evaluation and prediction model constructed using PLS regression analysis, are important compounds in forming the odor of whey. Reductions in the masses of hexanal, heptanal and 1-octen-3-ol can be measured by subjecting the whey odor to gas chromatography-mass spectrometry.

One aspect of the present invention is the aforementioned method for manufacturing a modified whey composition, method for modifying a whey composition or method for reducing the odor of whey, in which the masses of hexanal, heptanal and 1-octen-3-ol in the odor of the modified whey composition are reduced by at least 60% compared with the masses of hexanal, heptanal and 1-octen-3-ol in the odor of the unmodified whey composition.

Another aspect of the present invention is the aforementioned method for manufacturing a modified whey composition, method for modifying a whey composition or method for reducing the odor of whey, in which the masses of hexanal, heptanal and 1-octen-3-ol in the odor of the modified whey composition are reduced by at least 85%, at least 75% and at least 60% respectively compared with the masses of hexanal, heptanal and 1-octen-3-ol in the odor of the unmodified whey composition.

There are no particular limitations on the upper limits for the rates of reduction in the amounts of hexanal, heptanal and 1-octen-3-ol, provided the whey odor is within permitted levels when the modified whey composition is used as a foodstuff or a foodstuff raw material, and for example, may be 98% in the present invention.

<<PLS Regression Analysis>>

For example, a prediction model can be created using projection to latent structures using the partial least squares method (PLS) (SIMCA-P version 12.0, Umetrics Inc.).

By using PLS, the relationship between two sets of variables (the measured values and the response values) can be ascertained. In other words, by setting the compound corresponding with a specific retention time in the obtained chromatogram from the gas chromatography-mass spectrometry as an independent variable, creating matrix data using the mass spectrometry signal intensity as a dependent variable, and using the sensory evaluation results relating to the whey odor of each modified whey composition as the explanatory variable, a prediction model can be created by the PLS method.

In the method for manufacturing a modified whey composition or the method for modifying a whey composition according to the aforementioned first aspect, the reasons that the type of excellent thermal stability described above is obtained are thought to include the following. That is, the heat treatment conditions of heating at 80 to 150° C. for a period of 30 minutes to 1 second are conditions that are considered to cause complete denaturation of the whey protein. Performing a heat treatment of a typical raw whey or whey powder aqueous solution under these conditions causes crosslinking and aggregation of the whey protein in the heat denaturation process, generating aggregate lumps of large particle size which cause precipitation or gelling.

However, by adjusting the protein concentration in the liquid of the unmodified whey composition to not more than 1.3% by mass, adjusting the pH to a value of at least 6.8 and not more than 8.0, and then performing the heat treatment described above, the whey protein contained in the raw material whey liquid undergoes complete denaturation with the particle size maintained at substantially the same size as that prior to the heat treatment.

As a result, it is thought that the resistance of the whey protein to heat and calcium improves, so that when the modified whey composition containing the whey protein or a composition obtained by enriching the calcium content is reheated, the generation of aggregated lumps of large particle size is unlikely, and precipitation or gelling or the like is unlikely to occur.

In the modified whey liquids obtained in the actual examples described below, and the aqueous solutions obtained by dissolving the modified whey powders in water, no precipitation or gelling was detected. Further, when the particle size distribution was measured, the amount of particles having a particle size exceeding 1 μm in each liquid was not more than 10% of all the particles in the liquid.

The term "denaturation" refers to a change in the structure of the protein molecule, whereas the term "aggregation" describes the bonding together of a plurality of protein molecules to form a giant aggregate.

<<Method for Manufacturing Calcium-Enriched Modified Whey Composition>>

The method for manufacturing a calcium-enriched modified whey composition according to the third aspect of the present invention includes:

a step of obtaining a modified whey composition by performing a liquid preparation step of preparing a raw material whey liquid using a whey composition containing whey protein, and a heating step of subjecting the raw material whey liquid to a heat treatment, and a step of obtaining a calcium-enriched modified whey composition by adding a calcium-containing compound to the modified whey composition, wherein the liquid preparation step includes a treatment of adding an alkali to the whey composition, the pH of the raw material whey liquid is from 6.8 to 8.0, and the protein concentration in the liquid is not more than 1.3% by mass, the calcium content of the raw material whey liquid that is subjected to the heat treatment is at least 400 mg/100 g of solids but less than 700 mg/100 g of solids, the heat treatment is performed under conditions of 80 to 150° C. for a period of 30 minutes to 1 second, and following addition of the calcium-containing compound, the calcium content exceeds 400 mg/100 g of solids but is not more than 700 mg/100 g of solids.

By adding a calcium-containing compound to the modified whey composition, a calcium-enriched modified whey composition is obtained in which the calcium content within the solid content is larger than that of the modified whey composition.

Examples of the whey composition containing whey protein include the same compositions as the unmodified whey composition described above.

There are no particular limitations on the calcium-containing compound added to the modified whey composition, provided the compound can be used in foodstuffs, and examples include calcium salts such as calcium chloride, calcium phosphate and calcium citrate, and purified calcium such as milk calcium. Among these, the aforementioned calcium salts are preferable.

The amount added of the calcium-containing compound is an amount such that the calcium content of the obtained calcium-enriched modified whey composition is not more than 700 mg/100 g of solids. Provided the calcium content is not more than 700 mg/100 g of solids, excellent thermal stability can be maintained satisfactorily.

The calcium content of the calcium-enriched modified whey composition varies depending on the manufacturing conditions, but in terms of achieving more reliable thermal stability, is preferably not more than 650 mg/100 g of solids, and more preferably not more than 600 mg/100 g of solids.

In terms of thermal stability, there are no particular limitations on the lower limit for the calcium content of the calcium-enriched modified whey composition, but in terms of the usability of the composition as a calcium source, a higher calcium content is preferable.

Considering these factors, the calcium content of the calcium-enriched modified whey composition manufactured by the present aspect is preferably from 500 to 700 mg/100 g of solids, more preferably from 550 to 700 mg/100 g of solids, and still more preferably from 600 to 650 mg/100 g of solids.

On the other hand, the modified whey composition according to the present invention exhibits superior thermal stability to conventional whey compositions, and maintains excellent thermal stability even if the calcium content is increased beyond conventional compositions, and therefore one aspect of the calcium-enriched modified whey composition of the present invention is a calcium-enriched modified whey composition having a calcium content exceeding 500 mg/100 g of solids but not more than 700 mg/100 g of solids.

Another aspect of the calcium-enriched modified whey composition of the present invention is a calcium-enriched modified whey composition having a calcium content exceeding 600 mg/100 g of solids but not more than 700 mg/100 g of solids. Yet another aspect of the calcium-enriched modified whey composition of the present invention is a calcium-enriched modified whey composition having a calcium content exceeding 650 mg/100 g of solids but not more than 700 mg/100 g of solids.

There are no particular limitations on the method used for adding the calcium-containing compound to the modified whey composition, and either a method in which the obtained mixture is a liquid, or a powder mixing method in which the addition is performed in a powdered state may be used. For example, a liquid form or concentrated liquid form of the modified whey composition and the calcium-containing compound may be mixed, a powdered modified whey composition and an aqueous solution of the calcium-containing compound may be mixed, a powdered modified whey composition and a powdered calcium-containing compound may be mixed together with water, or a powdered modified whey composition and a powdered calcium-containing compound may be subjected to powder mixing.

The mixture obtained by mixing the modified whey composition and the calcium-containing compound may be used, as is, as a liquid or powdered calcium-enriched modified whey composition, the liquid mixture may be subjected to a concentration step to obtain a concentrated liquid type calcium-enriched modified whey composition, or the liquid mixture may be subjected to a concentration step and a drying step to obtain a powdered calcium-enriched modified whey composition. The concentration step can be performed using conventional methods. The drying step can be performed using a conventional drying method such as freeze drying or spray drying.

The calcium-enriched modified whey composition may contain only components derived from the modified whey composition and the calcium-containing compound, or if required, may also contain other components not derived from the modified whey composition or the calcium-containing compound.

Examples of these other components include sugars such as lactose, sucrose and dextrin.

These components may be added before, after, or at the same time as the addition of the calcium-containing compound.

As described above, the modified whey composition obtained using the method for manufacturing a modified whey composition or the method for modifying a whey composition according to the first aspect not only exhibits excellent thermal stability itself, but even when a calcium-containing compound is added to the modified whey composition to increase the calcium content, superior thermal stability similar to that of the modified whey composition prior to the addition of the calcium-containing compound can be maintained.

Accordingly, by adding a calcium-containing compound to the modified whey composition, a calcium-enriched modified whey composition can be obtained which not only has a similar level of superior thermal stability similar to that of the modified whey composition, but also has a higher calcium content than the modified whey composition prior to addition of the calcium-containing compound.

In the method disclosed in Patent Document 1, precipitation tends to occur during heating if the calcium content exceeds 650 mg/100 g of solids, but by using the manufacturing method of the present aspect, a calcium-enriched modified whey composition can be obtained which is unlikely to suffer precipitation during heating even if the calcium content exceeds 650 mg/100 g of solids.

For example, by using the manufacturing method of the present aspect, a calcium-enriched modified whey composition having a calcium content exceeding 650 mg/100 g of solids but not more than 700 mg/100 g of solids can be obtained which, when optionally concentrated or diluted with water to obtain a solution having a protein concentration in the liquid of not more than 1.3% by mass, yields a volume of precipitate measured by the precipitate volume evaluation described below of not more than 1 mL/100 mL, and preferably not more than 0.5 mL/100 mL.

(Precipitate Volume Evaluation)

The solution is subjected to a retort heat treatment at 120° C. for 10 minutes in an autoclave, is subsequently subjected to a centrifugal separation treatment at 3,000 rpm (centrifugal force: 1,500 g) for 5 minutes, and the amount of precipitate is then measured. The amount of precipitate is recorded as the volume (mL) of precipitate per 100 mL of the evaluation target solution.

Further, the modified whey composition obtained using the method for manufacturing a modified whey composition or the method for modifying a whey composition according to the first aspect has minimal whey odor compared with the unmodified whey composition, and has a favorable flavor with a natural milk sensation. Accordingly, a calcium-enriched modified whey composition obtained using this modified whey composition also has a favorable flavor.

The modified whey composition obtained using the method for manufacturing a modified whey composition or the method for modifying a whey composition according to the first aspect, and the calcium-enriched modified whey composition obtained using the manufacturing method according to the third aspect can each be used as a raw material for other products. Specific examples of such other products include beverages, milk formula for infants, and retort foods.

As described above, the modified whey composition and the calcium-enriched modified whey composition both have excellent thermal stability, and are resistant to precipitation and gelling when heating is performed in the liquid state for the purposes of pasteurization or the like. As a result, the modified whey composition and the calcium-enriched modified whey composition are particularly useful as raw materials for transparent liquid products such as transparent beverages.

EXAMPLES

Next, the present invention is described in further detail using a series of examples, but the present invention is in no way limited by these examples.

In each of the following examples (examples, comparative examples and test examples), percentage (%) represents percentage by mass unless otherwise indicated.

Protein concentrations in liquid were determined by calculation from the protein content in the raw material whey measured using the Kjeldahl method, and solid content concentrations were determined by calculation from the raw material whey solid content concentration determined by an ordinary pressure drying method and a sand mixing method.

The evaluation methods used in each of the following examples are described below.

<Thermal Stability>

[1. Simple Substance Thermal Stability Test]

Those modified whey compositions for evaluation which were liquid were evaluated as is, using the liquid as the evaluation sample, whereas powder compositions were dissolved in water at 50° C. to form an aqueous solution having a solid content of 10%, and evaluation was performed using this solution as the evaluation sample.

The evaluation sample was subjected to a retort heat treatment at 120° C. for 10 minutes in an autoclave. Following the retort heat treatment, the evaluation sample was cooled to ordinary temperature and subjected to a centrifugal separation treatment at 3,000 rpm (centrifugal force: 1,500 g) for 5 minutes, and the volume of precipitate produced (mL/100 mL) was measured.

The liquid state of the evaluation sample following the retort heat treatment (but before the centrifugal separation treatment) was ascertained visually, and evaluated against the following evaluation criteria.

(Evaluation Criteria for Evaluation Before Centrifuging)
 a: no precipitation or gelling is observed visually, and the solution is stable.
 b: slight precipitation is observed visually.
 c: precipitation and/or gelling is observed.

Based on the result of the above evaluation before centrifuging, and the measurement result for the volume of precipitate following the centrifugal separation treatment (precipitate volume after centrifuging), an overall evaluation of the thermal stability was made against the following evaluation criteria.

(Evaluation Criteria of Overall Evaluation)
 a: the result of the evaluation before centrifuging was a, and the precipitate volume after centrifuging was not more than 1 mL/100 mL.
 c: the precipitate volume after centrifuging was more than 1 mL/100 mL.

[2. Calcium-Enriched Thermal Stability Test]

Those modified whey compositions for evaluation which were liquid were evaluated as is, using the liquid as the evaluation sample, whereas powder compositions were dissolved in water at 50° C. to form an aqueous solution having a solid content of 10%, and evaluation was performed using this solution as the evaluation sample.

Calcium chloride dihydrate (manufactured by Nacalai Tesque, Inc.) was dissolved in water, the pH of the solution was adjusted to 6.8 with a 5% aqueous solution of sodium hydroxide (prepared by dissolving 96% sodium hydroxide manufactured by Kokusan Chemical Co., Ltd. in water), and a final adjustment of the solid content was performed with water to complete preparation of a 5% aqueous solution of calcium chloride. This 5% aqueous solution of calcium chloride was added to the evaluation sample in an amount sufficient to produce a total calcium content of 700 mg/100 g of solids, thus obtaining a calcium-enriched whey liquid. When the total calcium content of the evaluation sample was already 700 mg/100 g of solids, addition of the 5% aqueous solution of calcium chloride was unnecessary.

The thus obtained calcium-enriched whey liquid was subjected to a retort heat treatment at 120° C. for 10 minutes in an autoclave. Following the retort heat treatment, the evaluation sample was subjected to a centrifugal separation treatment at 3,000 rpm (centrifugal force: 1,500 g) for 5 minutes, and the volume of precipitate produced (mL/100 mL) was measured.

An evaluation before centrifuging and an overall evaluation were performed in the same manner as described above in [1. Simple Substance Thermal Stability Test].

The volume of precipitate in the calcium-enriched thermal stability test is usually larger than the volume of precipitate in the simple substance thermal stability test.

[3. Median Diameter Measurement]

Those modified whey compositions for evaluation which were liquid were evaluated as is, using the liquid as the evaluation sample, whereas powder compositions were dissolved in water at 50° C. to form an aqueous solution having a solid content of 10%, and evaluation was performed using this solution as the evaluation sample.

The particle size distribution of the particles (such as aggregates) contained in the evaluation sample was measured using a particle size distribution analyzer (LA-950, manufactured by Horiba, Ltd.), and based on the results, the median diameter of the particles was determined.

<Flavor>

Those modified whey compositions for evaluation which were liquid were evaluated as is, using the liquid as the evaluation sample, whereas powder compositions were dissolved in water at 50° C. to form an aqueous solution having a solid content of 10%, and evaluation was performed using this solution as the evaluation sample.

The flavor of each evaluation sample was evaluated by six trained flavor panelists, using the procedure described below.

Using an aqueous solution (solid content: 10%) of the powder obtained in Comparative Example 1 as a control (3 points), the flavor was evaluated by comparison with the control using the 5-step scale described below, and the average score of the six panelists was calculated.
 5 points: much better than the control.
 4 points: slightly better than the control.
 3 points: similar to the control.
 2 points: slightly worse than the control.
 1 point: much worse than the control.

Example 1

A raw whey obtained during cheese manufacture (following removal of the fat and curd using a conventional separator) was prepared as an unmodified whey composition. The pH of this whey was 6.2.

A 2% aqueous solution of sodium hydroxide (prepared by dissolving 96% sodium hydroxide manufactured by Kokusan Chemical Co., Ltd. in water) was added to the aforementioned whey to adjust the pH to 7.0 and complete preparation of a raw material whey liquid. The solid content of the raw material whey liquid was 7.0%, the protein concentration in the liquid was 0.9%, and the calcium content was 577 mg/100 g of solids.

The above raw material whey liquid was subjected to a heat treatment at 95° C. for 10 minutes (by indirect heating using a batch pasteurizer) to obtain a modified whey liquid. This modified whey liquid had a pH of 6.6, a solid content of 7.0%, and a calcium content of 577 mg/100 g of solids.

The thus obtained modified whey liquid was evaluated for thermal stability (simple substance thermal stability test, calcium-enriched thermal stability test, median diameter measurement) and flavor using the procedures described above. The results are shown in Table 1.

TABLE 1

| [Thermal stability tests] | | | |
|---|---|---|---|
| | Simple substance | Ca-enriched | |
| Evaluation before centrifuging | a | a | [Median diameter] |
| Precipitate volume after centrifuging (mL/100 mL) | 0.15 | 0.2 | 0.2 μm [Flavor evaluation] |
| Overall evaluation | a | a | 4.7 points *[1] |

*[1] the characteristic whey odor was reduced, and a fresh milk sensation was obtained.

Example 2

A whey solution was prepared by dissolving the whey powder obtained in Comparative example 1 described below in water at 50° C., using sufficient water to generate a solid content of 10%. The pH of this whey solution was 6.1.

A 2% aqueous solution of sodium hydroxide (prepared by dissolving 96% sodium hydroxide manufactured by Kokusan Chemical Co., Ltd. in water) was added to the aforementioned whey solution to adjust the pH to 6.8 and complete preparation of a raw material whey liquid. The solid content of the raw material whey liquid was 10.0%, the protein concentration in the liquid was 1.3%, and the calcium content was 577 mg/100 g of solids.

The above raw material whey liquid was subjected to a primary heat treatment at 85° C. for 5 minutes (by heating and holding using a plate pasteurizer), and was then subjected to a secondary heat treatment at 130° C. for 2 seconds (by heating using a plate pasteurizer) to obtain a modified whey liquid. This modified whey liquid had a pH of 6.7, a solid content of 9.2%, and a calcium content of 577 mg/100 g of solids.

The obtained modified whey liquid was concentrated (by conventional methods) to a solid content of 43% using a centrifugal thin film evaporator, and a milk powder dryer was then used to perform spray drying (by conventional methods) to obtain a modified whey powder. The solid content of this modified whey powder was 96.3%, and when the powder was dissolved in water to obtain a solution having a solid content of 10%, the pH of the solution was 6.7.

The thus obtained modified whey powder was evaluated for thermal stability and flavor using the procedures described above. The results are shown in Table 2.

TABLE 2

| [Thermal stability tests] | | | |
|---|---|---|---|
| | Simple substance | Ca-enriched | |
| Evaluation before centrifuging | a | a | [Median diameter] |
| Precipitate volume after centrifuging (mL/100 mL) | 0.1 | 0.4 | 0.3 μm [Flavor evaluation] |
| Overall evaluation | a | a | 4.8 points *[2] |

*[2] the whey odor was reduced, and a fresh milk sensation was obtained.

Example 3

A commercially available WPC (manufactured by Milei GmbH) and the whey powder obtained in Comparative Example 1 described below were mixed together to obtain a protein content in the solid content of 34%. The thus obtained mixture was dissolved in water at 50° C. to prepare a whey solution. This whey solution had a pH of 6.4.

A 2% aqueous solution of sodium hydroxide (prepared by dissolving 96% sodium hydroxide manufactured by Kokusan Chemical Co., Ltd. in water) was added to the aforementioned whey solution to adjust the pH to 7.0 and complete preparation of a raw material whey liquid. The solid content of the raw material whey liquid was 3.8%, the protein concentration in the liquid was 1.3%, and the calcium content was 540 mg/100 g of solids.

The above raw material whey liquid was subjected to a heat treatment at 95° C. for 10 minutes (by indirect heating using a batch pasteurizer) to obtain a modified whey liquid. This modified whey liquid had a pH of 6.9, a solid content of 3.8%, and a calcium content of 540 mg/100 g of solids.

The thus obtained modified whey liquid was evaluated for thermal stability and flavor using the procedures described above. The results are shown in Table 3.

TABLE 3

| [Thermal stability tests] | | | |
|---|---|---|---|
| | Simple substance | Ca-enriched | |
| Evaluation before centrifuging | a | a | [Median diameter] |
| Precipitate volume after centrifuging (mL/100 mL) | 0.2 | 0.35 | 0.2 μm [Flavor evaluation] |
| Overall evaluation | a | a | 3.2 points *[3] |

*[3] a flavor derived from protein was slightly noticeable, but the whey odor was reduced.

Comparative Example 1

A whey powder was produced by conventional methods from the same raw whey as that used as the unmodified whey composition in Example 1 (pH: 6.2, solid content:

7.5%, protein concentration in liquid: 1.0%, calcium content: 577 mg/100 g of solids). Specifically, the whey powder was produced using the procedure described below.

A heat treatment was performed (by heating with a batch pasteurizer) by heating the aforementioned raw whey until a temperature of 74° C. was reached, and then halting the heating immediately the temperature was reached (hereafter this method is referred to as "74° C. arrival heating").

The heat treated raw whey was concentrated to a solid content of 43% using a centrifugal thin film evaporator. The thus obtained concentrated liquid was spray dried using a milk powder dryer to obtain a whey powder. The solid content of this whey powder was 96.0%, and when the powder was dissolved in water to obtain a solid content of 10%, the pH of the solution was 6.1.

The thus obtained whey powder was evaluated for thermal stability and flavor using the procedures described above. The results are shown in Table 4.

TABLE 4

| [Thermal stability tests] | | | |
|---|---|---|---|
| | Simple substance | Ca-enriched | |
| Evaluation before centrifuging | c | c | [Median diameter] |
| Precipitate volume after centrifuging (mL/100 mL) | 12 | 18 | 0.2 μm [Flavor evaluation] |
| Overall evaluation | c | c | 3 points *[5] |

*[5] a whey odor was noticeable.

Comparative Example 2

A whey solution was prepared by dissolving a commercially available whey powder (manufactured by Morinaga Milk Industry Co., Ltd.) in sufficient water at 50° C. to obtain a solid content of 18%. The pH of this whey solution was 6.1, and the calcium content was 509 mg/100 g of solids.

The whey solution was heated to 50° C. Using a batch method, a Na-type cation exchange resin (Diaion SK-1B, manufactured by Mitsubishi Chemical Corporation) and the heated whey solution were reacted together to effect a cation exchange treatment. Following the cation exchange treatment, the whey solution had a pH of 6.4, a solid content of 15.0%, and a calcium content of 81 mg/100 g of solids.

Following the above cation exchange treatment, the whey solution was diluted with water to obtain a raw material whey liquid. The raw material whey liquid had a pH of 6.4, a solid content of 10.0%, and a protein concentration in the liquid of 1.3%.

The above raw material whey liquid was subjected to a heat treatment at 95° C. for 10 minutes (by indirect heating using a batch pasteurizer) to obtain a heat treated whey liquid. This heat treated whey liquid had a pH of 6.4, a solid content of 10.0%, and a calcium content of 81 mg/100 g of solids.

The thus obtained heat treated whey liquid was evaluated for thermal stability and flavor using the procedures described above. The results are shown in Table 5.

TABLE 5

| [Thermal stability tests] | | | |
|---|---|---|---|
| | Simple substance | Ca-enriched | |
| Evaluation before centrifuging | a | c | [Median diameter] |
| Precipitate volume after centrifuging (mL/100 mL) | 0.05 | 24 | 0.2 μm [Flavor evaluation] |
| Overall evaluation | a | c | 4 points *[6] |

*[6] a slight salty taste was noticeable, but the whey odor was reduced, and a fresh milk sensation was obtained.

Comparative Example 3

A whey solution was prepared by dissolving the whey powder obtained in Comparative example 1 in water at 50° C. The pH of this whey solution was 6.0.

A 2% aqueous solution of sodium hydroxide (prepared by dissolving 96% sodium hydroxide manufactured by Kokusan Chemical Co., Ltd. in water) was added to the aforementioned whey solution to adjust the pH to 7.0 and complete preparation of a raw material whey liquid. The solid content of the raw material whey liquid was 14.0%, the protein concentration in the liquid was 1.8%, and the calcium content was 577 mg/100 g of solids.

The above raw material whey liquid was subjected to a heat treatment at 95° C. for 10 minutes (by indirect heating using a batch pasteurizer) to obtain a heat treated whey liquid. This heat treated whey liquid had a pH of 6.8, a solid content of 14.0%, and a calcium content of 577 mg/100 g of solids.

The thus obtained heat treated whey liquid was evaluated for thermal stability and flavor using the procedures described above. The results are shown in Table 6.

TABLE 6

| [Thermal stability tests] | | | |
|---|---|---|---|
| | Simple substance | Ca-enriched | |
| Evaluation before centrifuging | a | b | [Median diameter] |
| Precipitate volume after centrifuging (mL/100 mL) | 0.5 | 2 | 65 μm [Flavor evaluation] |
| Overall evaluation | a | c | 1.6 points *[7] |

*[7] an odor peculiar to heated whey protein (heated odor) was noticeable.

Comparative Example 4

A commercially available WPC (manufactured by Milei GmbH) and the whey powder obtained in Comparative Example 1 were mixed together to obtain a protein content in the solid content of 34%. The thus obtained mixture was dissolved in water at 50° C. to prepare a whey solution. This whey solution had a pH of 6.2.

A 2% aqueous solution of sodium hydroxide (prepared by dissolving 96% sodium hydroxide manufactured by Kokusan Chemical Co., Ltd. in water) was added to the aforementioned whey solution to adjust the pH to 7.0 and complete preparation of a raw material whey liquid. The solid content of the raw material whey liquid was 11.0%, the protein concentration in the liquid was 3.7%, and the calcium content was 540 mg/100 g of solids.

The above raw material whey liquid was subjected to a heat treatment at 95° C. for 10 minutes (by indirect heating using a batch pasteurizer) to obtain a heat treated whey liquid. This heat treated whey liquid had a pH of 6.8, a solid content of 11.0%, and a calcium content of 540 mg/100 g of solids.

The thus obtained heat treated whey liquid was evaluated for thermal stability and flavor using the procedures described above. The results are shown in Table 7.

TABLE 7

| | [Thermal stability tests] | | |
|---|---|---|---|
| | Simple substance | Ca-enriched | |
| Evaluation before centrifuging | c *[8] | c *[8] | [Median diameter] |
| Precipitate volume after centrifuging (mL/100 mL) | measurement impossible *[8] | measurement impossible *[8] | 59 μm [Flavor evaluation] |
| Overall evaluation | c | c | 1 point *[9] |

*[8] overall gelling occurred, and measurement of the precipitate volume after centrifuging was impossible.
*[9] partial gelling occurred, and the texture on the tongue was poor. Further, a heated odor peculiar to the whey protein and the whey odor were very strong.

As is evident from the above results, in the modified whey compositions (modified whey liquids and modified whey powders) obtained in Examples 1 to 3, despite the fact that the whey protein was denatured, the results of measuring the median diameter yielded similar results to the whey powder of Comparative Example 1, which was manufactured using a typical conventional method so that the whey protein did not undergo denaturation.

Further, compared with Comparative Example 1, the modified whey compositions obtained in Examples 1 to 3 exhibited results for the simple substance thermal stability test and the calcium-enriched thermal stability test which were more favorable, indicating superior thermal stability. Moreover, the whey odor and heated odor were reduced, and the flavor was improved.

On the other hand, in the heat treated whey obtained in Comparative Example 2, which did not undergo pH adjustment, although the simple substance thermal stability test result was similar, the result for the calcium-enriched thermal stability test and the flavor were inferior.

In the case of the heat treated whey liquids obtained in both Comparative Example 3, in which the protein concentration in the raw material whey liquid was 1.8%, and Comparative Example 4, in which the protein concentration in the liquid was 3.7%, aggregates having large particle sizes were produced.

Further, the result of the simple substance thermal stability test and the result of the calcium-enriched thermal stability test were both inferior to the results of the modified whey compositions obtained in Examples 1 to 3, indicating poor thermal stability. Moreover, the flavor was also poor.

Particularly in the case of the heat treated whey liquid obtained in Comparative Example 4, the retort heat treatment caused gelling, and the thermal stability and the flavor were both extremely poor.

Test Example 1

This test was performed to confirm the effect that the pH of the raw material whey liquid has on the thermal stability.

The whey powder obtained in Comparative Example 1 was dissolved in water at 50° C. to prepare a whey solution. The pH of this whey solution was 6.1.

A 2% aqueous solution of sodium hydroxide (prepared by dissolving 96% sodium hydroxide manufactured by Kokusan Chemical Co., Ltd. in water) was added to the aforementioned whey solution to adjust the pH to 7.0, 7.5 or 8.0, and water was then added to adjust the solid content concentration to 10% and the protein concentration in the liquid to 1.3%, thus completing preparation of a series of raw material whey liquids.

Each of the above raw material whey liquids was subjected to a heat treatment at 95° C. for 10 minutes (by indirect heating using a batch pasteurizer) to obtain a modified whey liquid.

The thus obtained modified whey liquids (Samples 1-1 to 1-3) were evaluated for thermal stability using the procedures described above. The results are shown in Table 8, together with the results for Comparative Example 1 and Example 2.

TABLE 8

| | | Simple substance thermal stability test | | | Ca-enriched thermal stability test | | | |
|---|---|---|---|---|---|---|---|---|
| | pH before heating | Evaluation before centrifuging | Precipitate volume mL/100 mL | Overall evaluation | Evaluation before centrifuging | Precipitate volume mL/100 mL | Overall evaluation | Median diameter (μm) |
| Comparative example 1 | 6.1 | c | 18 | c | c | 16 | c | 0.2 |
| Example 2 | 6.8 | a | 0.1 | a | a | 0.4 | a | 0.3 |
| 1-1 | 7.0 | a | 0.4 | a | a | 0.4 | a | 0.2 |
| 1-2 | 7.5 | a | 0.15 | a | a | 0.4 | a | 0.2 |
| 1-3 | 8.0 | a | 0.1 | a | a | 0.2 | a | 0.2 |

Based on the above results it was confirmed that provided the pH of the raw material whey liquid was at least 6.8 but not more than 8.0, excellent thermal stability with little likelihood of precipitation could be obtained even if the calcium content was enriched to 700 mg/100 g of solids.

Test Example 2

This test was performed to confirm the effect that the raw material whey liquid heat treatment conditions has on the thermal stability.

The whey powder obtained in Comparative Example 1 was dissolved in water at 50° C. to prepare a whey solution. The pH of this whey solution was 6.1.

A 2% aqueous solution of sodium hydroxide (prepared by dissolving 96% sodium hydroxide manufactured by Kokusan Chemical Co., Ltd. in water) was added to the aforementioned whey solution to adjust the pH to 7.0 and complete preparation of a raw material whey liquid. The solid content of the raw material whey liquid was 10%, and the protein concentration in the liquid was 1.3%.

The raw material whey liquid was subjected to heat treatment under heating conditions according to one of A to D described below, thus obtaining a series of modified whey liquids.

The thus obtained modified whey liquids (Samples 2-1 to 2-4) were evaluated for thermal stability using the procedures described above. The results are shown in Table 9, together with the results for Example 2.

Sample 2-4 is the same as Sample 1-1 of Test Example 1. The heat treatment conditions in Example 2 are described in E below.

(Heating Conditions)
A: no heat treatment.
B: heat treatment by 74° C. attainment heating (using a batch pasteurizer).
C: heat treatment at 80° C. for 30 minutes (by heating using a batch pasteurizer).
D: heat treatment at 95° C. for 10 minutes (by heating using a batch pasteurizer).
E: primary heat treatment at 85° C. for 5 minutes (by heating and holding using a plate pasteurizer)+secondary heat treatment at 130° C. for 2 seconds (by heating using a plate pasteurizer).

The whey powder obtained in Comparative Example 1 was dissolved in water at ordinary temperature to prepare a whey solution. The pH of this whey solution was 6.1.

To this whey solution was added an aqueous solution of potassium hydroxide (KOH), potassium carbonate ($K_2CO_3$), sodium carbonate ($Na_2CO_3$), sodium bicarbonate ($NaHCO_3$) or tripotassium phosphate ($K_3PO_4$) to adjust the pH to 7.0 and complete preparation of a raw material whey liquid. Each of the raw material whey liquids had a solid content of 10% and a protein concentration in the liquid of 1.3%.

Each of the above raw material whey liquids was subjected to a heat treatment at 95° C. for 10 minutes (by indirect heating using a batch pasteurizer) to obtain a modified whey liquid.

TABLE 9

| | | Simple substance thermal stability test | | | Ca-enriched thermal stability test | | | |
|---|---|---|---|---|---|---|---|---|
| | Heating conditions | Evaluation before centrifuging | Precipitate volume mL/100 mL | Overall evaluation | Evaluation before centrifuging | Precipitate volume mL/100 mL | Overall evaluation | Median diameter (μm) |
| 2-1 | A | a | 0.25 | a | c | 5.2 | c | 0.2 |
| 2-2 | B | a | 0.4 | a | c | 6.4 | c | 0.2 |
| 2-3 | C | a | 0.35 | a | a | 0.75 | a | 0.2 |
| 2-4 | D | a | 0.4 | a | a | 0.4 | a | 0.2 |
| Example 2 | E | a | 0.1 | a | a | 0.4 | a | 0.3 |

Based on the above results it was confirmed that provided the heat treatment conditions for the raw material whey liquid were from 80 to 150° C. for a period of 30 minutes to 1 second, excellent thermal stability with little likelihood of precipitation could be obtained even if the calcium content was enriched to 700 mg/100 g of solids.

The thus obtained modified whey liquids (Samples 3-1 to 3-5) were evaluated for thermal stability using the procedures described above. The results are shown in Table 10, together with the results for Sample 1-1 from Test Example 1 (using sodium hydroxide (NaOH) as the alkali).

TABLE 10

| | | Simple substance thermal stability test | | | Ca-enriched thermal stability test | | | |
|---|---|---|---|---|---|---|---|---|
| | Alkali | Evaluation before centrifuging | Precipitate volume mL/100 mL | Overall evaluation | Evaluation before centrifuging | Precipitate volume mL/100 mL | Overall evaluation | Median diameter (μm) |
| 1-1 | NaOH | a | 0.4 | a | a | 0.4 | a | 0.2 |
| 3-1 | KOH | a | 0.25 | a | a | 0.5 | a | 0.2 |
| 3-2 | $K_2CO_3$ | a | 0.15 | a | a | 0.2 | a | 0.2 |
| 3-3 | $Na_2CO_3$ | a | 0.1 | a | a | 0.3 | a | 0.3 |
| 3-4 | $NaHCO_3$ | a | 0.1 | a | a | 0.1 | a | 0.2 |
| 3-5 | $K_3PO_4$ | a | 0.25 | a | a | 0.5 | a | 0.2 |

Test Example 3

This test was performed to confirm the effect that the alkali used in the pH adjustment treatment has on the thermal stability.

Based on the above results it was confirmed that regardless of which of sodium hydroxide, potassium hydroxide, potassium carbonate, sodium carbonate, sodium bicarbonate or tripotassium phosphate was used as the alkali, an excellent improvement in the thermal stability could be obtained.

Among these alkalis, sodium hydroxide and potassium hydroxide offer the advantage that, compared with the other alkalis, the target pH can be obtained using a smaller amount of the alkali, meaning the salt content can be suppressed.

Test Example 4

This test was performed to confirm the rate of reduction in the masses of the odor components hexanal, heptanal and 1-octen-3-ol in the odor of the modified whey composition.
<Analysis of Whey Odor Components by Solid-Phase Microextraction Gas Chromatography-Mass Spectrometry>

Solutions of the whey powders of Comparative Example 1 and Example 2 were analyzed by solid-phase microextraction gas chromatography-mass spectrometry, and the odor components were measured.

The peak areas corresponding with the retention times for hexanal, heptanal and 1-octen-3-ol in the solid-phase microextraction gas chromatography-mass spectrometry analyses of the solutions of the whey powders of Comparative Example 1 and Example 2 are shown in Table 11.

Further, the rate of reduction in the mass of each of hexanal, heptanal and 1-octen-3-ol in the whey powder of Example 2 compared with the corresponding mass in Comparative Example 1 is also shown in Table 11.

The rate of reduction was calculated using the following formula:

[(peak area of odor component of whey powder of Comparative Example 1−peak area of odor component of whey powder of Example 2)/peak area of odor component of whey powder of Comparative Example 1]×100

In the above formula, the peak area of each odor component corresponds with the mass of that odor component.
<Measurement Method>

The whey powders obtained in Comparative Example 1 and Example 2 were each dissolved in water at 50° C. to prepare sample solutions having a solid content of 10%.

These samples solutions were analyzed by solid-phase microextraction gas chromatography-mass spectrometry in accordance with the conditions described below to measure the odor components.
a) Measurement Equipment
  GC: model 6890, manufactured by Agilent Technologies, Inc.
  MS: model 5973A, manufactured by Agilent Technologies, Inc.
  Column: Innowax (product name, manufactured by Agilent Technologies, Inc.)
  Film thickness: 0.5 μm
  Length: 30 m
  Diameter: 0.25 mm
b) Method of Separating and Concentrating Odor Components
  Using a solid-phase microextraction method (SPME fiber: 50/30 μm Stable Flex DVB/Carboxen/PDMS, manufactured by Supelco Inc.), the odor in the head space was extracted into the fiber and measured at 50° C. for 30 minutes.
c) Measurement Conditions
  GC
    Injection temperature: 250° C.
    Gas flow rate: 1.2 ml/minute of helium gas
    Oven temperature increase conditions:
    40° C., 2 minutes
    4° C./minute (to 120° C.)
    6° C./minute (to 240° C.), hold 10 minutes
  MS
    Ionization voltage: 70 eV
    Measurement mode: Scan (3 scan/second)

TABLE 11

Reduction rates for odor components of whey powder

| | Whey powder of Comparative Example 1 | Whey powder of Example 2 | Rate of reduction |
|---|---|---|---|
| Hexanal peak area | 33,037,416 | 3,978,755 | 88.0% |
| Heptanal peak area | 24,563,295 | 5,822,857 | 76.3% |
| 1-octen-3-ol peak area | 1,533,605 | 593,554 | 61.3% |

Based on the above results it was evident that in the odor components of the whey powder of Example 2, the masses of hexanal, heptanal and 1-octen-3-ol had been reduced significantly compared with the equivalent masses in the odor components of the whey powder of Comparative Example 1. In other words, it was evident that the whey odor had been reduced in the whey powder of Example 2.

INDUSTRIAL APPLICABILITY

The present invention is able to provide a method for manufacturing a modified whey composition which yields improvements in the thermal stability and the flavor of a whey composition containing whey protein, a modified whey composition obtained using the manufacturing method, and a method for manufacturing a calcium-enriched modified whey composition using the manufacturing method.

The invention claimed is:

1. A method for manufacturing a modified whey composition, the method comprising a liquid preparation step of preparing a raw material whey liquid using a whey composition comprising whey protein without undergoing a calcium reduction treatment, and a heating step of subjecting the raw material whey liquid to a heat treatment, wherein
  the liquid preparation step comprises a treatment of adding an alkali to the whey composition,
  a pH of the raw material whey liquid is from 6.8 to 8.0, and a protein concentration in the raw material whey liquid is not more than 1.3% by mass,
  a calcium content of the raw material whey liquid that is subjected to the heat treatment is from 400 to 700 mg/100 g of solids, and
  the heat treatment is performed under conditions of 80 to 150° C. for a period of 30 minutes to 1 second.

2. The method according to claim 1, wherein the alkali is one or both of sodium hydroxide and potassium hydroxide.

3. The method according to claim 1, wherein the modified whey composition has a property that a volume of precipitate following a centrifugal separation treatment of an evaluation sample of the modified whey composition is not more than 0.5 mL/100 mL when the modified whey composition is evaluated by a calcium-enriched thermal stability test.

4. The method according to claim 3, wherein the modified whey composition is in a state in which particles in a liquid of an evaluation sample of the modified whey composition following a retort heat treatment but prior to a centrifugal separation treatment have a particle size distribution in which an amount of particles having a particle size exceeding 1 μm is not more than 10% of all particles in the liquid when the modified whey composition is evaluated by the calcium-enriched thermal stability test.

5. The method according to claim 2, wherein the modified whey composition has a property that a volume of precipitate following a centrifugal separation treatment of an evaluation sample of the modified whey composition is not more than 0.5 mL/100 mL when the modified whey composition is evaluated by a calcium-enriched thermal stability test.

6. The method according to claim 5, wherein the modified whey composition is in a state in which particles in a liquid of an evaluation sample of the modified whey composition following a retort heat treatment but prior to a centrifugal separation treatment have a particle size distribution in which an amount of particles having a particle size exceeding 1 μm is not more than 10% of all particles in the liquid when the modified whey composition is evaluated by the calcium-enriched thermal stability test.

7. The method according to claim 1, wherein masses of hexanal, heptanal, and 1-octen-3-ol in an odor of the modified whey composition are reduced by at least 60% compared with masses of hexanal, heptanal, and 1-octen-3-ol in an odor of the whey composition used for the raw material whey liquid.

8. The method according to claim 1, wherein masses of hexanal, heptanal, and 1-octen-3-ol in an odor of the modified whey composition are reduced by at least 85%, at least 75%, and at least 60% respectively compared with masses of hexanal, heptanal, and 1-octen-3-ol in an odor of the whey composition used for the raw material whey liquid.

9. The method according to claim 2, wherein masses of hexanal, heptanal, and 1-octen-3-ol in an odor of the modified whey composition are reduced by at least 60% compared with masses of hexanal, heptanal, and 1-octen-3-ol in an odor of the whey composition used for the raw material whey liquid.

10. The method according to claim 2, wherein masses of hexanal, heptanal, and 1-octen-3-ol in an odor of the modified whey composition are reduced by at least 85%, at least 75%, and at least 60% respectively compared with masses of hexanal, heptanal, and 1-octen-3-ol in an odor of the whey composition used for the raw material whey liquid.

* * * * *